(12) United States Patent
Nagata et al.

(10) Patent No.: US 10,073,116 B2
(45) Date of Patent: Sep. 11, 2018

(54) SCANNING PROBE MICROSCOPE AND ITS SAMPLE HOLDER

(71) Applicant: HITACHI, LTD., Tokyo (JP)

(72) Inventors: Sanato Nagata, Tokyo (JP); Tomihiro Hashizume, Tokyo (JP); Akira Nambu, Tokyo (JP); Hideaki Koizumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/533,535

(22) PCT Filed: Dec. 24, 2014

(86) PCT No.: PCT/JP2014/084032
§ 371 (c)(1),
(2) Date: Jun. 6, 2017

(87) PCT Pub. No.: WO2016/103338
PCT Pub. Date: Jun. 30, 2016

(65) Prior Publication Data
US 2017/0343580 A1    Nov. 30, 2017

(51) Int. Cl.
*G01Q 30/14* (2010.01)
*G01Q 30/18* (2010.01)
*G01Q 30/20* (2010.01)
*G01Q 60/18* (2010.01)
*G01Q 60/24* (2010.01)

(52) U.S. Cl.
CPC ............ *G01Q 30/20* (2013.01); *G01Q 30/14* (2013.01); *G01Q 60/18* (2013.01); *G01Q 60/24* (2013.01)

(58) Field of Classification Search
CPC ........ G01Q 30/08; G01Q 30/12; G01Q 30/14; G01Q 30/18; G01Q 30/20
See application file for complete search history.

(56) References Cited

U.S. PATENT DOCUMENTS 5,831,153 A * 11/1998 Binnig ................ B82Y 35/00
73/105
5,939,623 A    8/1999 Muramatsu et al.
(Continued)

FOREIGN PATENT DOCUMENTS

JP    9-229948    9/1997
JP    2008-203057   9/2008
(Continued)

OTHER PUBLICATIONS

International Search Report for WO 2016/103338 A1, dated Jan. 27, 2015.

*Primary Examiner* — Jason McCormack
*Assistant Examiner* — Sean Luck
(74) *Attorney, Agent, or Firm* — Volpe and Koenig, P.C.

(57) ABSTRACT

This sample holder for a scanning probe microscope is constituted of (1) a container that retains a liquid and (2) a flat-plate-shaped upper cover that covers an upper opening of the container and that has a narrow slit above the position where a sample is placed. In the upper cover, the slit has a slit width with which a thin film of the liquid is formed over the upper surface of the sample when the liquid fills the space between the container and the upper cover. The thin film of the liquid has a film thickness smaller than the distance between the upper surface of the sample and the upper cover.

13 Claims, 16 Drawing Sheets

(56) References Cited

U.S. PATENT DOCUMENTS

| 9,423,416 B2 | 8/2016 | Nambu et al. |
| 2015/0192604 A1 | 7/2015 | Yamamoto et al. |

FOREIGN PATENT DOCUMENTS

| WO | 2014/006734 A1 | 1/2014 |
| WO | 2014/016952 A1 | 1/2014 |
| WO | 2014/033844 A1 | 3/2014 |
| WO | 2014/041677 A1 | 3/2014 |

* cited by examiner

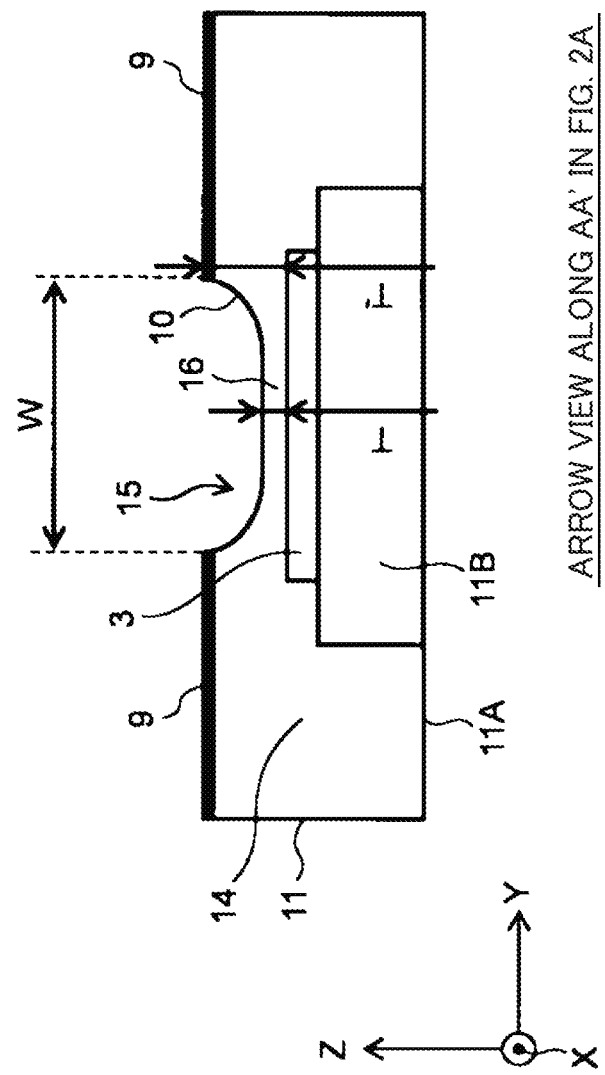

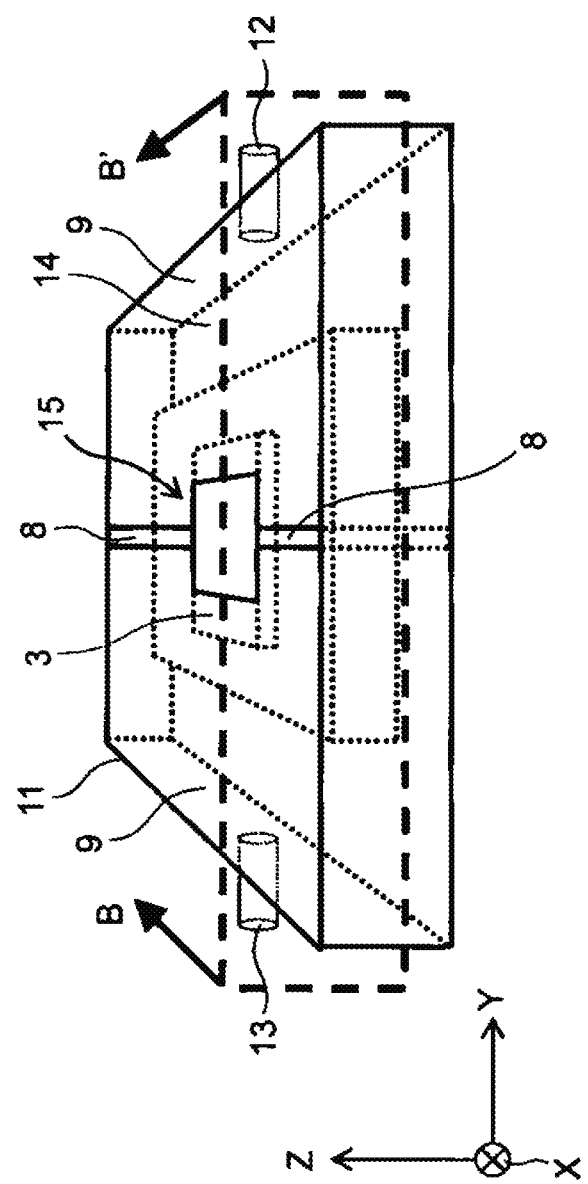

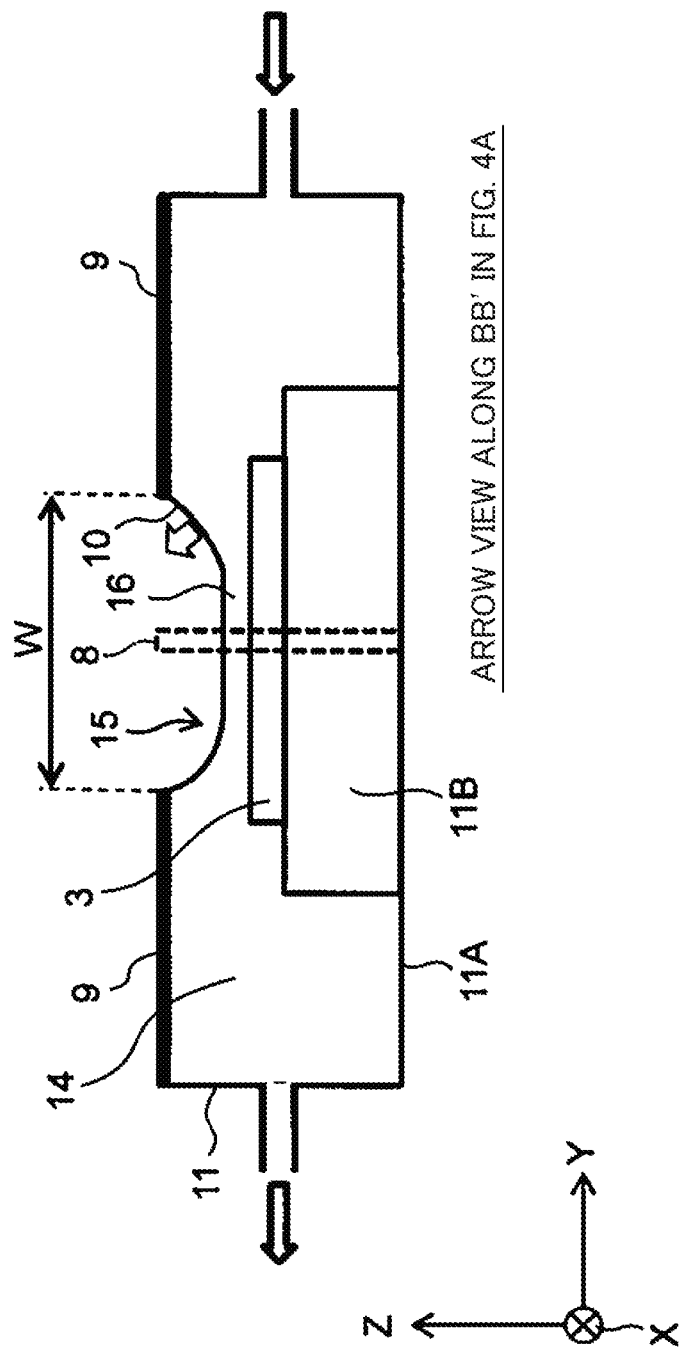

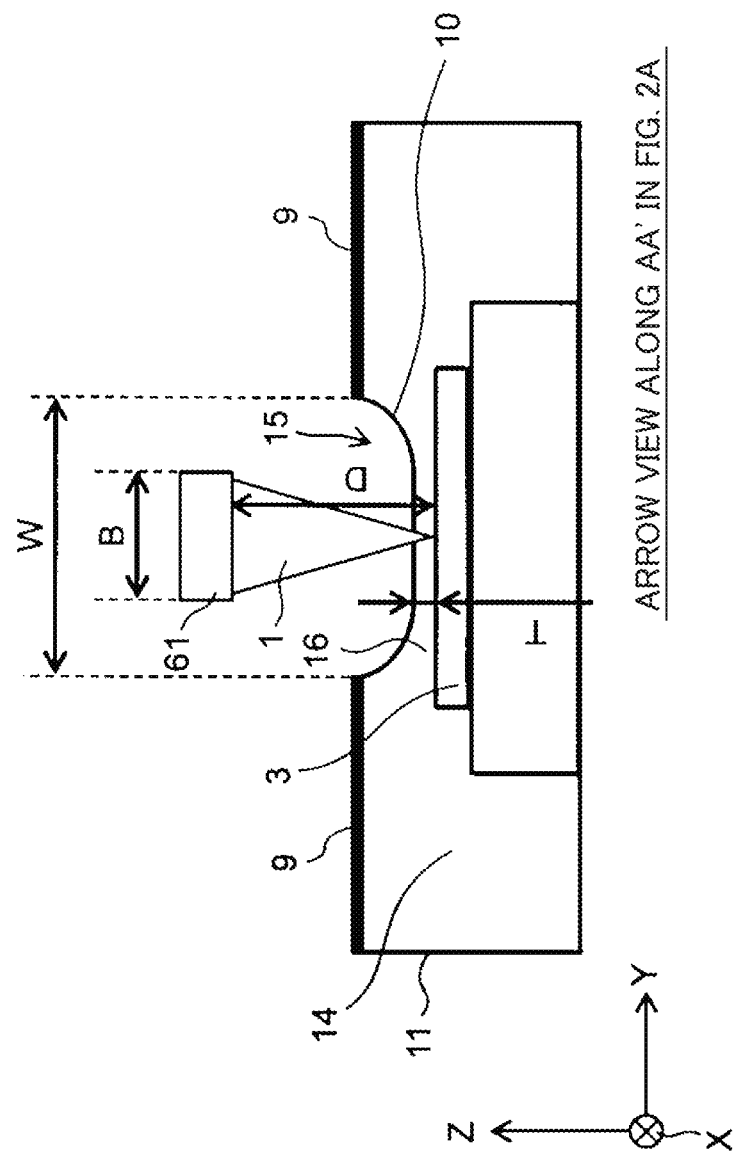

SCANNING PROBE MICROSCOPE AND ITS SAMPLE HOLDER

TECHNICAL FIELD

The present invention relates to a scanning probe microscope and its sample holder.

BACKGROUND ART

In measurement, evaluation or control of adhesion of cells to biological substrate material in culture solution and the subsequent biological reaction (spreading, differentiation and the like), hydration phenomena of biomolecules, living tissues, biological substrate material and the like is significant. The hydration structure shows a three-dimensional structure formed with (1) interaction between sample surface and water molecules and (2) interaction including hydrogen bond between water molecules, in the interface between the sample and culture solution with water as a main component. It is considered that so-called biocompatibility typified by adhesion between an inner wall of an artificial blood vessel and red blood cells or the like is closely related to the hydration structure. Further, the unevenness of the sample surface in the culture solution, the electric potential distribution, the composition distribution and the array structure of the molecules or protein and the like relate to the biological reaction of the biomolecules, the living tissues, the biological substrate material and the like in the culture solution, and they are specially significant characteristics.

Conventionally, linear or nonlinear optical microscopes based on Raman spectroscopy, second harmonic generation spectroscopy (hereinafter referred to as SHG), sum frequency generation (hereinafter referred to as SFG) spectroscopy, and the like, are used for observation or measurement of the interface between the sample such as biomolecules, living tissues, biological substrate material or the like in the culture solution, and the culture solution. The SFG spectroscopy measures the intensity of scattered light from a region without the inversion symmetry in a sample by nonlinear optical phenomenon between scattering of infrared incident light (Raman scattering) related to molecular vibration of molecules included in the sample and visible incident light. Especially it is possible to measure the ordered structure of water molecules related to the hydration structure in the interface between the sample and the culture solution. As a nonlinear optical microscope, microscopes using a nonlinear optical method to surface-selectively observe the interaction between a probe and a target with e.g. SHG or SFG originated from water molecules, solvent molecules, or a marker in the vicinity of the interface, are known. However, the lateral resolution in these optical microscopes is higher than 100 nm or typically about 1 μm.

On the other hand, scanning probe microscopes have atomic force microscopy (hereinafter referred to as AFM) as a basis. As an example of the scanning probe microscope, Kelvin probe force microscope is known. The Kelvin probe force microscope is based on a method of mapping electrostatic force distribution by scanning a conductive probe on the sample surface while detecting an electrostatic force acting between a cantilever having the conductive probe and the sample as deflection of the cantilever. As the atomic force and the like other than the electrostatic force are also applied to the conductive probe, it is necessary to separate the electrostatic force from the other interaction. For this purpose, first, the cantilever is vibrated, and the distance between the conductive probe and the sample is adjusted so as to keep a vibrational amplitude, which reduces due to the atomic force to act upon contact between the conductive probe and the sample, constant. With this configuration, the position of the probe in a height direction of the sample surface is determined, and in a state where the conductive probe is away from the sample surface by a predetermined distance, an electrostatic force as a long-range force is detected from phase change of the vibration of the cantilever.

In the scanning probe microscope, generally, lateral resolution of about 1 nm by unevenness measurement is expected, and lateral resolution of about 10 nm by electrostatic force and optical measurement is expected. However, as an interaction region between the probe and the sample is limited to about a diameter of the tip of the probe, it is generally difficult to particularly realize a scanning probe microscope to use a weak signal physical quantity like the nonlinear optical method.

To realize the Raman spectroscopy with a scanning probe microscope by compensating the weak signal, various techniques related to tip-enhanced Raman detection method using surface-enhanced Raman scattering with a probe have been proposed. As one of these techniques, for example, a probe microscope, in which the depth of liquid held on a sample table is smaller than the length of a probe attached to the tip of an oscillator by using a holder cover 11 and a spacer 15 provided on a sample surface, to suppress reduction of a quality factor due to viscous resistance, has been proposed (Patent Literature 1). Further, a probe microscope which periodically displaces the probe position of the oscillator and controls the relative distance between the probe and the sample table, for synchronization with irradiation of pulsed laser light, to maximize tip-enhanced detection efficiency, has been proposed (Patent Literature 2).

CITATION LIST

Patent Literature

Patent Literature 1: International Patent Publication WO2014/016952
Patent Literature 2: International Patent Publication WO2014/033844

SUMMARY OF INVENTION

Technical Problem

In the probe microscope disclosed in Patent Literature 1, a measuring probe is inserted into an opening provided in a bottom surface of the holder cover 11 (a part to regulate the distance between the culture solution and the sample surface), to perform desired measurement. However, since the bottom surface of the holder cover 11 is positioned lower than the liquid surface of the surrounding culture solution, the culture solution rises in a convex from the opening by surface tension. Correspondingly, the length of the probe soaked in the culture solution is longer than the distance regulated with the bottom surface of the holder cover 11 and the sample surface. Further, Patent Literature 2 discloses synchronization of pulsed laser beam irradiation. However, there is no consideration of improvement in the lateral resolution, by optimization of the depth of the culture solution between the tip of the probe and the sample surface.

The inventors have considered realization of a scanning probe microscope capable of measuring physical information in the interface between the sample in the liquid and the liquid with much higher lateral resolution, by further reducing the depth of the liquid on the sample surface in which the probe is soaked, and a sample holder appropriate to the measurement.

Solution to Problem

One of typical inventions is a sample holder for scanning probe microscope including: (1) a container that holds liquid; and (2) a tabular-shaped upper lid that covers an upper opening of the container and that has a slim slit above a placement position of a sample, the slit having a slit width to form a thin film of the liquid having a film thickness smaller than a distance between an upper surface of the sample and the upper lid, on the upper surface of the sample, when the liquid is filled between the container and the upper lid.

Another one of the typical inventions is a scanning probe microscope including: (1) a sample holder; (2) a probe; (3) an oscillator that displaces the probe in upward and downward directions; (4) a pulsed laser light source that irradiates a pulsed laser beam to a region of a sample measured with the probe; (5) a filter integrated detector that measures intensity of output light caused in the sample by irradiation of the pulsed laser beam by energy spectroscopy; (6) a scanning mechanism that moves the sample holder in a horizontal direction; and (7) a control device that controls the oscillator, the pulsed laser beam source, and the scanning mechanism.

Further, another one of the typical inventions is a scanning probe microscope comprising: (1) a sample holder; (2) a probe; (3) an oscillator that displaces the probe in upward and downward directions; (4) a probe power source that applies alternating current voltage and direct current voltage to the probe; (5) a detector that detects a force applied to the probe; (6) a scanning mechanism that moves the sample holder in a horizontal direction; and (7) a control device that controls the oscillator, the probe power source, and the scanning mechanism.

Advantageous Effects of Invention

According to the present invention, it is possible to further reduce the film thickness of the liquid covering the surface of the sample, and to measure the physical information of the sample surface in the liquid with much higher lateral resolution. Other objects, constituents and advantages than those described above will be clearer with the following description of the embodiments.

BRIEF DESCRIPTION OF DRAWINGS

FIG. 2B is a schematic cross-sectional view of the sample holder used in the first embodiment.

FIG. 4A is a schematic configuration diagram of the sample holder used in a second embodiment.

FIG. 4B is a schematic cross-sectional view of the sample holder used in the second embodiment.

FIG. 8B is a schematic cross-sectional view of the sample holder used in the ninth embodiment.

DESCRIPTION OF EMBODIMENTS

Hereinbelow, embodiments of the present invention will be described based on the drawings. Note that the embodiments of the present invention are not limited to the embodiments to be described later. Various modifications can be made within a scope of the technical idea.

Outline

Hereinbelow, a scanning probe microscope will be described which is based on the tip-enhanced detection method for compensation of weak signal light by providing a probe in near field light (evanescent light) occurred on the sample surface and amplifying the electric field intensity of light in the vicinity of the sample surface with near field light from the probe and near field light from the sample. However, the scanning probe microscope according to the respective embodiments have various forms in correspondence with SFG spectroscopy, SHG spectroscopy, and other liner or nonlinear optical spectroscopy.

The respective embodiments are based on new knowledge of generating a liquid thin film having a sufficiently thin thickness on the surface of a sample by optimization of a slit width provided in an upper lid of a sample holder in correspondence with the surface tension of the liquid (culture solution, water or the like) and wettability of the sample to the liquid, to further enhance the intensity of a pulsed laser beam which arrives through the liquid at the sample, to cause high-intensity nonlinear optical signal. Note that the liquid thin film having a sufficiently thin film thickness is characterized in that it is generated by forming the liquid in a concave shape with the slit of the upper lid.

First Embodiment

Figure 1:
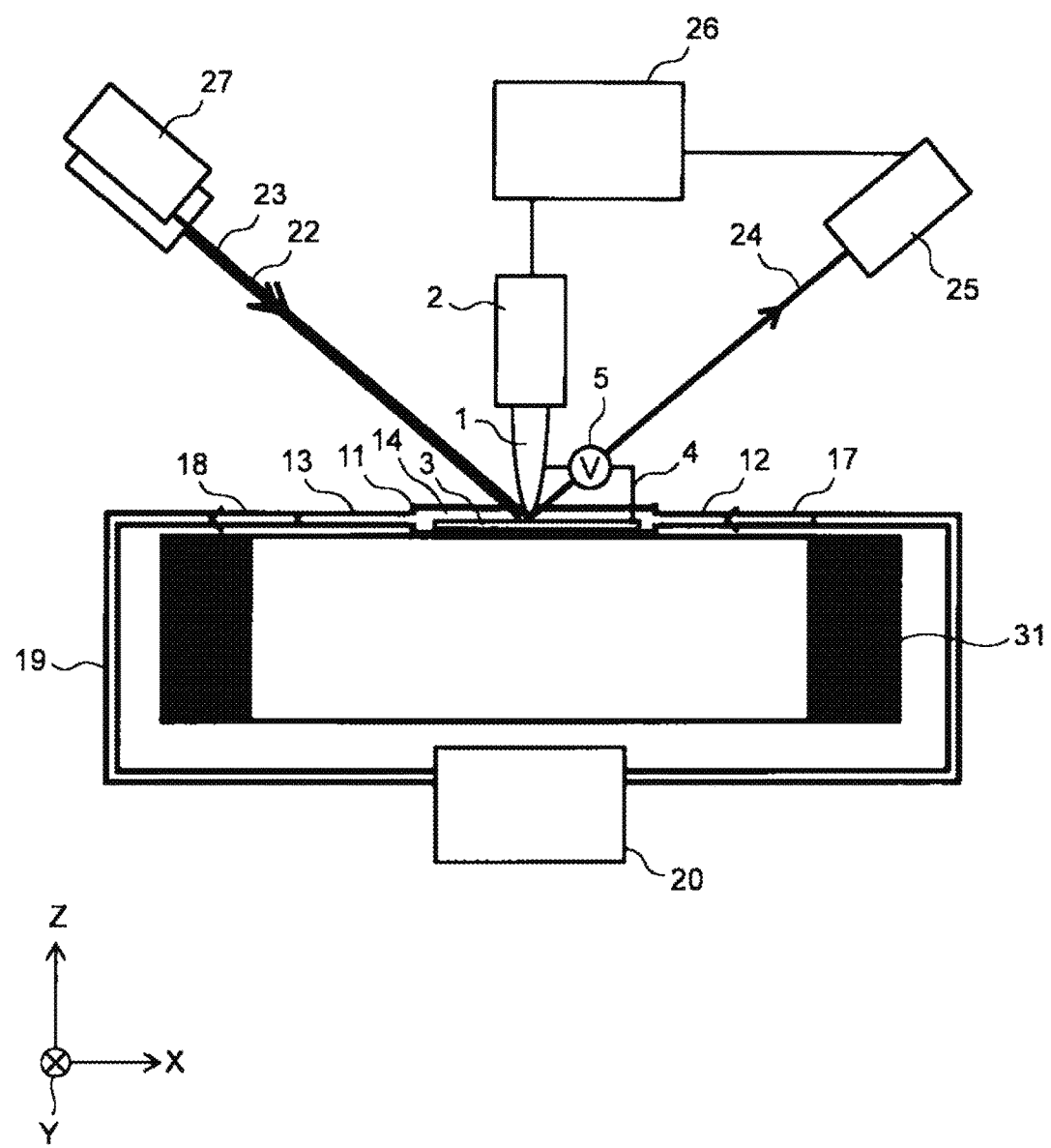
FIG. 1 is a schematic configuration diagram of a scanning probe microscope (nonlinear optical scanning probe microscope) according to a first embodiment.

FIG. 1 discloses a tip-enhanced scanning SFG microscope as a scanning probe microscope according to the present embodiment. The tip-enhanced scanning SFG microscope is a sort of nonlinear optical scanning probe microscope. A probe 1 is attached to an oscillator 2, and is displaced in upward and downward directions with the oscillator 2. With this displacement, the relative position (distance) between the probe 1 and a sample 3 is controlled.

As the probe 1, a material, with which the near field light intensity around the tip is amplified or concentrated when the probe 1 is placed in incident light, is selected. For example, when Raman scattering is used as in the case of the Raman spectroscopy or the SFG spectroscopy, metal or alloy of gold, silver, copper and aluminum for effective use of surface-enhanced Raman scattering is selected as the material of the probe 1. A silicone probe with an evaporated gold thin film having a thickness of 1 to 20 nm is a leading candidate as the material of the probe 1.

The oscillator 2 according to the present embodiment oscillates mainly in a vertical direction to the surface of the sample 3, to control the distance between the probe 1 and the sample 3 to 300 nm or shorter. The natural frequency of the oscillator 2 is e.g. 200 kHz to 2 MHz. For example, a quartz crystal oscillator which expands and contracts in a lengthwise direction is used as the oscillator 2. Furthermore, a tuning-fork type quartz crystal oscillator generally used in a scanning probe microscope such as an atomic force microscope, a piezoelectric crystal oscillator, an oscillator having a cantilever provided with a piezoelectric device and the like are available.

With the oscillation of the oscillator 2, the probe 1 oscillates in the vertical direction to the surface of the sample 3 at a frequency near the natural frequency of the oscillator 2 (within about ±1% of the natural frequency). With the interaction (force) between the probe 1 and the sample 3, a phase difference occurs between the voltage applied to the oscillator 2 and the actual oscillation amplitude of oscillator 2. With the phase difference between the alternating current voltage applied to the oscillator 2 and the electric current flowing in the oscillator 2, the interaction (force) between the probe and the sample is obtained, and the distance between the probe and the sample is obtained.

When the relative position between the sample 3 and the probe 1 is scanned in the vertical direction to the upper surface of the sample 3 and in a plane direction to the upper surface of the sample 3, while the phase difference is maintained constant (while the distance between the probe and the sample is maintained constant), it is possible to construct an AFM as a form of the scanning probe microscope, and it is possible to measure the unevenness of the sample surface. A scanning mechanism 31 is used for this scanning. The distance between the probe 1 and the sample 3 is generally 0 nm (contact) to 100 nm in the nearest positions. It is possible to insert the probe 1 into the inside of the sample 3. When the relative position between the sample 3 and the probe 1 is scanned in the vertical direction to the upper surface of the sample 3 and the plane direction to the upper surface of the sample 3 while the oscillation amplitude of the oscillator 2 is reduced by a fixed amount, the distance between the probe 1 and the sample 3 may be set to 0 nm in the nearest positions (tapping mode AFM).

A probe power source 5 is connected through a wiring 4 to the probe 1. With this probe power source 5, it is possible to apply an alternating current voltage and a direct current voltage between the probe 1 and the sample 3. However, in the present embodiment, a voltage is not applied between the probe 1 and the sample 3. In the present embodiment, human hepatoma cell line (HepG2) cells cultured on a mica substrate are fixed with formalin and used as the sample 3. However, as the sample 3, a surface-processed polycarbonate, a metal substrate such as gold, or other substrates may be used.

The sample holder 11 has a culture solution inlet 12 and a culture solution recovery port 13. A culture solution circulation mechanism 19 (e.g. a flow passage pipe) is connected to the culture solution inlet 12 and the culture solution recovery port 13. The culture solution circulation mechanism 19 is provided with a culture-solution circulation control mechanism 20. With the culture-solution circulation control mechanism 20, holding or exchange of the culture solution 14 is realized. Water or solvent may be used in place of the culture solution 14. In the present embodiment, water is used in place of the culture solution 14.

A pulsed laser beam generated with a pulsed laser oscillator 27 or plural pulsed laser beams synchronized with each other are inputted in the vicinity of the region of the sample 3 to which the probe 1 stands close. With the incidence of the pulsed laser beam, output light 24 is generated from the sample 3. The output light 24 is received with a filter integrated detector 25. The filter integrated detector 25 disperses the output light 24 by frequency, and measures the intensity of each spectrum.

In the present embodiment, a green pulsed laser beam (first pulsed laser beam 22) having a wavelength of 532 nm, and a variable infrared pulsed laser beam (second pulsed laser beam 23) having a wavelength of 2.3 to 10 microns, synchronized with each other, are inputted into the sample 3. In this case, the filter integrated detector 25 measures the intensity of the output light 24 with regard to a frequency as the sum of the frequency of the first pulsed laser beam 22 and the frequency of the second pulsed laser beam 23 (sum frequency). It is possible to perform SFG spectrometry by recording the intensity of the output light 24 of the sum frequency depending on the frequency of the second pulsed laser beam 23.

In the present embodiment, it is possible to discuss the orientation of hydrocarbons included in the cells of the sample 3 with the sum frequency intensity corresponding to the wave number of the second pulsed laser beam 23 of about 2900 $cm^{-1}$. Further, it is possible to discuss the orientation of water molecules in the interface between the cells of the sample 3 or the mica substrate and the culture solution 14 with the sum frequency intensity corresponding to the wave number of about 3100 $cm^{-1}$.

In the SFG, it is known that the output intensity is proportional to the product between the intensities of incident infrared light and incident visible light synchronized with the infrared light. Further, in the SHG and other secondary nonlinear optical phenomena, generally, the output intensity is proportional to the square of the intensity of incident light. Further, from the experiment in the present embodiment, it is suggested that in the SFG, there is a threshold value to extremely reduce the output intensity when the product between the intensity of the incident infrared light and the incident visible light synchronized with the infrared light is equal to or higher than a predetermined value.

Accordingly, in the tip-enhanced scanning SFG microscope, signal detection using pulsed laser with high intensity per pulse is overwhelmingly advantageous in comparison with signal detection using continuous wave laser (CW laser). For example, in the 50 mW CW laser having a wavelength of 532 nm, used in the tip-enhanced Raman, the number of photons per second is $1.34 \times 10^{17}$. On the other hand, in the SFG, 0.1 to 1 mJ pulsed laser having a wavelength of 532 nm is used. Considering the peak output of the 1 mJ pulsed laser, the number of photons included per pulse is $2.68 \times 10^{15}$. The pulse width of this pulsed laser is 20 to 30 ps. The number of photons in the CW laser included in this pulse time (20 ps) is $2.7\times10^6$. In the pulsed laser, in comparison with the CW laser, the number of photons is larger by 9 or more digits. Accordingly, the nonlinear optical phenomena mapping such as SHG and SFG using pulsed laser is overwhelmingly advantageous.

However, to detect a signal by SFG, SHG or the like efficiently, it is necessary to move the tip of the probe sufficiently closer to the sample surface so as to use the effect of Raman signal enhancement. It is considered that in the Raman spectroscopy, the effect of Raman signal enhancement does not appear when the distance between the probe and the sample is equal to or longer than 26.5 nm. Further, it is indicated that when the distance is equal to or shorter than 26.5 nm, the effect of Raman signal enhancement exponentially increases. For example, it is desirable that the distance between the probe 1 and the surface of the sample 3 is about 2 nm or shorter. The distance between the probe 1 and the surface of the sample 3 is controlled and oscillated with the oscillator 2. The oscillation period is 200 kHz to 2 MHz and is not necessarily synchronized with general pulsed laser oscillation period of 50 Hz to 200 kHz.

In the present embodiment, the effect of Raman signal enhancement is realized by controlling the oscillation amplitude of the probe 1 to 1 nm or shorter with the control device 26. The effect of Raman signal enhancement is also effective in the tip-enhanced scanning second harmonic microscope shown in the following embodiment, the tip-enhanced scanning optical probe microscopes by other nonlinear optical phenomena, shown in the following embodiments, in addition to the tip-enhanced scanning SFG microscope.

When an atomic force microscope (AFM) is constructed and the probe 1 and the sample 3 are sufficiently close to each other, localized plasmon polaritons are excited with the tip of the probe 1. With the effect of probe enhancement by enhancement of electric field intensity of the Raman signal, the intensity of the output light 24 at the sum frequency is rapidly enhanced (tip-enhanced SFG spectroscopy). Further, by measurement of the intensity of the output light 24 at the sum frequency with a particular wave number while scanning a part of the surface of the sample 3 with the probe 1, it is possible to map the orientation or the spatial distribution of the water molecules in the interface between the sample 3 and the culture solution 14 with high lateral resolution (tip-enhanced scanning SFG microscope). In the present embodiment, with the effect of tip-enhancement, the output light 24 at the sum frequency is enhanced 10000 times, and the lateral resolution of the scanning sum frequency microscope becomes 10 nm.

Figure 2A:
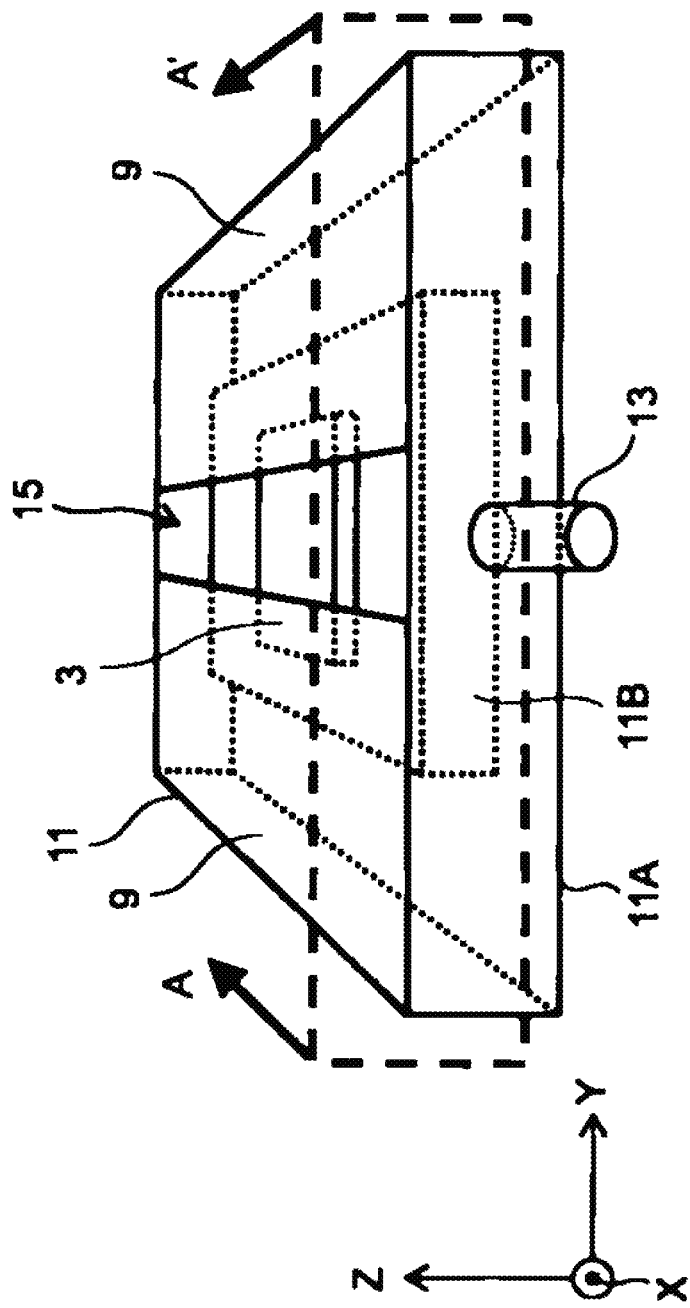
FIG. 2A is a schematic configuration diagram of a sample holder used in the first embodiment.

FIG. 2A shows a schematic configuration of the sample holder 11 used in the present embodiment. FIG. 2A is a bird's-eye diagram viewed from an incident direction of a pulsed laser beam (FIG. 1). Accordingly, the culture solution recovery port 13 is shown. However, the culture solution inlet 12 is omitted. FIG. 2B is a schematic cross-sectional view of the sample holder 11 showing an arrow view along a line A-A' in FIG. 2A.

The sample holder 11 has a rectangular-shaped container 11A to circulatably hold the culture solution 14, a sample table 11B provided in the container 11A, and a tabular-shaped upper lid 9 to cover an upper opening of the container 11A. In the upper lid 9, a slit 15 is formed along a flow passage direction of the culture solution 14 (along a direction from the culture solution inlet 12 to the culture solution recovery port 13). The slit 15 is a slim opening from the side of the culture solution inlet 12 to the side of the culture solution recovery port 13, and is provided in an upper position of the sample table 11B. The probe 1 and the pulsed laser beam are introduced into the sample holder 11 through the slit 15. The sample 3 is placed on an upper surface of the sample table 11B.

In measurement, the sample holder 11 (the space surrounded by the container 11A and the upper lid 9) is filled with the culture solution 14. As shown in FIG. 2B, the liquid surface of the culture solution 14 corresponds with the height of the rear surface of the upper lid 9. Accordingly, the liquid surface of the culture solution 14 is higher than the upper surface of the sample 3 placed on the sample table 11B, and a flow passage of the culture solution 14 is also formed on the upper surface of the sample 3. Note that in the case of the present embodiment, a thin film of the culture solution 14 formed on the upper surface of the sample 3 (culture solution thin film 16) is smaller than the distance between the upper surface of the sample 3 and the upper lid 9 (the liquid surface of the culture solution 14 in other parts than the slit 15) by capillary action caused by the presence of the slit 15. That is, as a shape 10 of the culture solution 14 is dented in a concave shape in the part of the slit 15, a film thickness T of the culture solution 14 is thinner than the other parts of the slit 15.

The film thickness T of the culture solution thin film 16 is determined based on the surface tension of the culture solution 14, the wettability of the culture solution 14 in the sample 3, a distance T' between the upper lid 9 of the sample holder and the upper surface of the sample 3, and a slit width W. Generally, the greater the surface tension of the culture solution 14 is, the smaller the film thickness T of the culture solution thin film 16 is. The poorer the wettability of the culture solution 14 in the sample 3 is, the smaller the film thickness T of the culture solution thin film 16 is. The smaller the distance T' between the upper lid 9 of the sample holder 11 and the sample 3 is, the smaller the film thickness T of the culture solution thin film 16 is.

The second pulsed laser beam 23 absorbed in the culture solution thin film 16 generated on the surface of the sample 3 depends on the culture solution 14 and the wave number of the second pulsed laser beam 23 (infrared light). Accordingly, to generate a SFG signal by arrival of the second pulsed laser beam 23 with sufficient intensity through the culture solution tin film 16 at the sample 3, it is necessary that the intensity of the second pulsed laser beam 23 is sufficiently high or the film thickness T of the culture solution thin film 16 is sufficiently small.

For example, it is known that the attenuation distance of infrared light with a wave number of about 3100 $cm^{-1}$ to water is about 0.1 mm. In the present embodiment, it was found that when the energy density of the second pulsed laser beam 23 was 120 $\mu J/mm^2/ps$ in standard, the second pulsed laser beam 23 arrived through the culture solution thin film 16 having a film thickness of 100 μm at the sample 3, to generate a SFG signal. Accordingly, when the energy density of the second pulsed laser beam 23 is about thrice (more precisely, $e \approx 2.7$ times as the base of natural logarithm), it passes through the culture solution thin film 16 having a film thickness of 200 μm; and when the energy density of the second pulsed laser beam 23 is about nine times, it passes through the culture solution thin film 16 having a film thickness of 300 μm.

Assuming that the film thickness T of the culture solution thin film is given as r×100 μm, for generation of SFG signal, it is required that the energy density of the second pulsed laser beam 23 per unit area and per unit time is given as 60 to $480\times3^{r-1}$ $\mu J/mm^2/ps$. Note that r is a coefficient for establishment of the relationship to the film thickness T (μm), r=T/100, and gives the ratio between the film thickness T of the culture solution thin film 16 and the 100 μm.

For example, in a case where the sample 3 is a mica substrate and water is used in place of the culture solution 14, the upper lid 9 is provided via a spacer (not shown) so as to set the distance T' between the upper lid 9 of the sample holder 11 and the sample 3 to 100 μm. In a case where the water infiltrates the upper surface of the sample 3 by capillary action between the upper lid 9 of the sample holder 11 and the sample 3, when the slit width W is 1.0 to 2.8 mm, it is possible to form the culture solution thin film 16 having a film thickness of 30 to 80 μm.

When the water is used in place of the culture solution 14, it is not necessary to discuss the transmittance of the first pulsed laser beam 22 (visible light) in the water thin film (corresponding to the culture solution thin film 16). Generally, as in the case of the second pulsed laser beam 23, a similar discussion is required in the transmittance of the first pulsed laser beam 22 in the culture solution thin film 16.

Figure 3A:
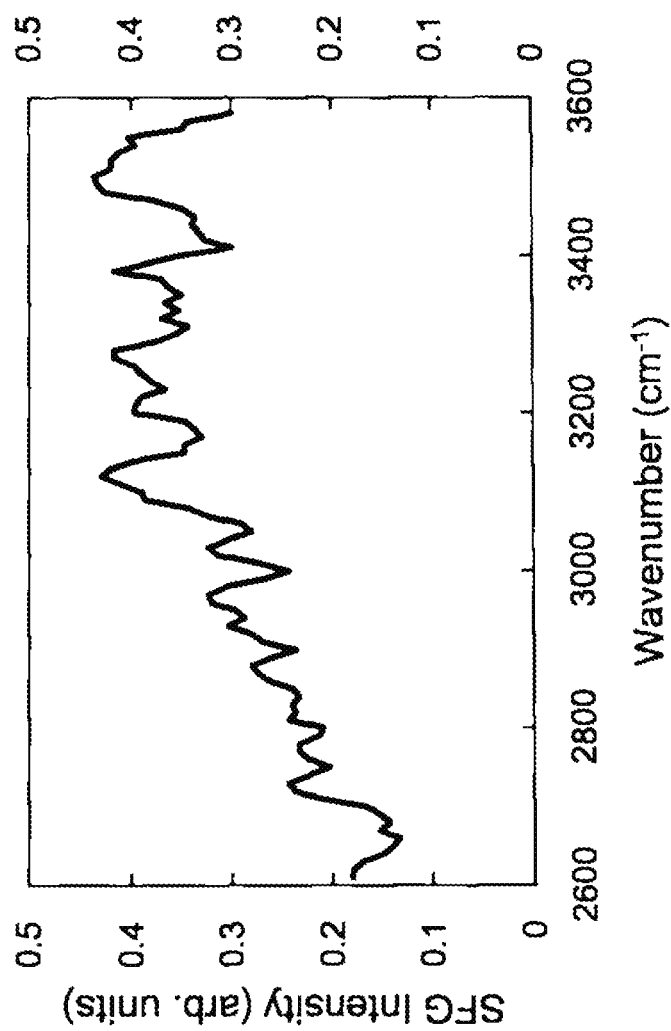
FIG. 3A is a plot diagram showing the frequency dependence of SFG light intensity when a culture solution thin film is sufficiently thin and a nonlinear optical signal is caused.

FIG. 3A shows the measurement result of SFG signal when the second pulsed laser beam 23, satisfying the following conditions and having sufficiently high intensity, arrives at the sample 3 (as described above, when the culture solution thin film 16 having a sufficiently small thickness is formed).

(1) A mica substrate and human hepatoma cell line (HepG2) cells fixed on the mica substrate are used as the sample 3.
(2) Water is used in place of the culture solution 14.
(3) The slit width W is 2.0 mm.

In this case, it is possible to observe an SFG signal caused from the orientation of the hydrocarbons included in the cells of the sample 3 (corresponding to the wave number of about 2900 $cm^{-1}$ of the second pulsed laser beam 23) and the orientation of the water molecules in the interface between the cells of the sample 3 and the mica substrate and the water (corresponding to the wave number of about 3100 $cm^{-1}$ of the second pulsed laser beam 23).

Figure 3B:
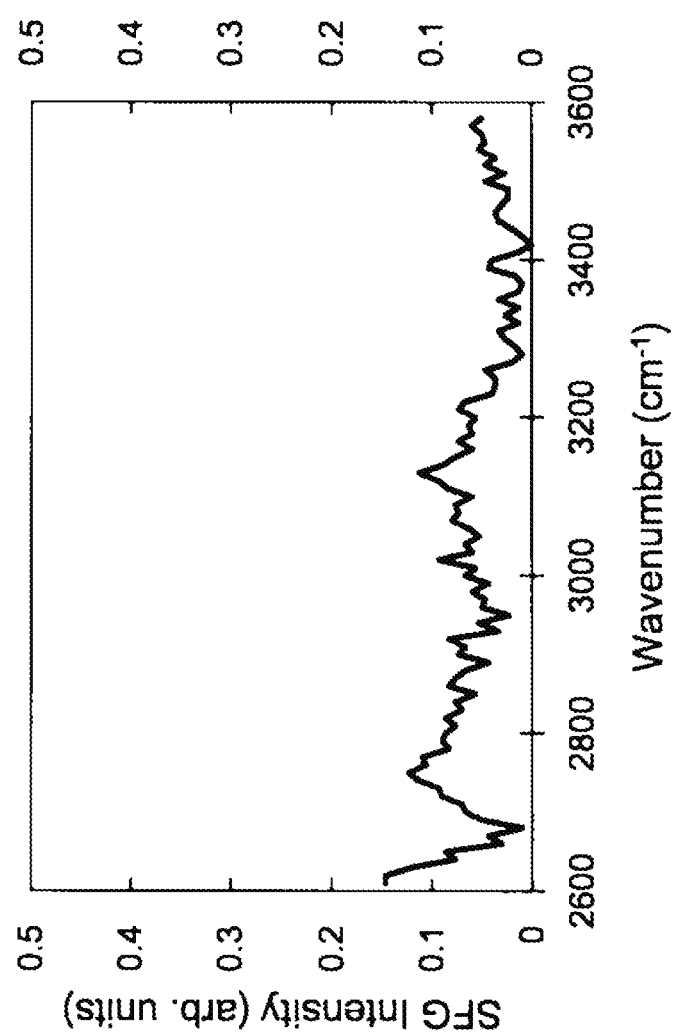
FIG. 3B is a plot diagram showing the frequency dependence of the SFG light intensity when the culture solution thin film is thick, and a nonlinear optical signal is not caused.

FIG. 3B is a diagram showing the wave number dependence of the SFG light intensity when the intensity of the second pulsed laser beam 23 is not sufficient and an SFG signal is not caused.

In this manner, when the conditions of the slit width W and the intensity of the second pulsed laser beam 23 are appropriately selected, a nonlinear optical signal is caused in the sample-culture solution interface. As shown in FIG. 3A, it is possible to measure an SFG spectrum. As a result, it is possible to measure physical information in the sample in the culture solution-culture solution interface with a high lateral resolution. Note that when the thickness of the culture solution thin film 16 is too thick to the intensity of the second pulsed laser beam 23, it is not possible to obtain a sufficient nonlinear optical signal as shown in FIG. 3B.

Second Embodiment

In the present embodiment, the tip-enhanced scanning SFG microscope, in which the culture solution 14 can be changed, will be described. The schematic configuration of the scanning probe microscope in the present embodiment is the same as that in the first embodiment (the configuration shown in FIG. 1). The difference is the configuration of the sample holder 11.

FIG. 4A shows a schematic configuration of the sample holder 11 used in the present embodiment. FIG. 4A is a bird's-eye diagram viewed from the incident direction of the pulsed laser beam (FIG. 1). Note that the culture solution inlet 12 and the culture solution recovery port 13 are provided in a different direction from that in the first embodiment. Further, the sample holder 11 is provided with the slit 15 to intersect the flow of the culture solution 14. Note that the slit 15 is provided so as to cross a region where the sample 3 is installed.

FIG. 4B is a schematic cross-sectional diagram of the sample holder 11, showing an arrow view along a line B-B' in FIG. 4A. Note that in FIG. 4B, a partition 8 which does not exist on the line B-B' in FIG. 4A is represented with a broken line. In the present embodiment, the probe 1 and the pulsed laser beam are also introduced into the sample holder 11 through the slit 15. Further, the slit width W is selected on the same conditions as those in the first embodiment. Accordingly, when the sample holder 11 is filled with the culture solution 14, the culture solution thin film 16 is formed on the upper surface of the sample 3.

The film thickness T of the culture solution thin film 16 is determined based on the surface tension of the culture solution 14, the wettability of the culture solution 14 in the sample 3, the distance T' between the upper lid 9 of the sample holder and the upper surface of the sample 3 (the distance corresponding to the thickness of the unshown spacer), and the slit width W. Generally, the greater the surface tension of the culture solution 14 is, the smaller the film thickness T of the culture solution thin film 16 is. The poorer the wettability of the culture solution 14 in the sample 3 is, the smaller the film thickness T of the culture solution thin film 16 is. The smaller the distance T' between the upper lid 9 of the sample holder and the sample 3 is, the smaller the film thickness T of the culture solution thin film 16 is.

The sample holder 11 according to the present embodiment is provided with the culture solution partition 8 along a slit 15, crossing the flow passage, from one side to the other side of the container 11A except the opening above the sample 3. With the culture solution partition 8, the space in the sample holder 11 is divided into two spaces on the upstream side and on the downstream side. The culture solution 14 flows from the upstream side to the downstream side through a peripheral region of the sample 3 without the culture solution partition 8. That is, the flow passage is formed in the peripheral region of the sample 3.

As the culture solution partition 8 acts so as to interrupt the flow of the culture solution 14, a cross-sectional shape of the culture solution thin film 16 formed on the upper surface of the sample 3 is asymmetric (nonuniform) as shown in FIG. 4B on the upstream side and on the downstream side. That is, as indicated with an arrow in FIG. 4B, the upstream side of the culture solution 14 (the side of the culture solution inlet 12) rises upward, and becomes nonuniform (the arrow in FIG. 4B). However, the expansion of the culture solution 14 does not influence the film thickness T of the culture solution thin film 16. That is, the film thickness T of the culture solution thin film 16 is determined based on the surface tension of the culture solution 14, the wettability of the culture solution 14 in the sample 3, the distance T' between the upper lid 9 of the sample holder and upper surface of the sample 3, and the slit width W, as in the case of the first embodiment.

Accordingly, in the case of the present embodiment, by optimizing the slit width W and the intensity of the second pulsed laser beam 23, it is possible to generate a nonlinear optical signal in the sample-culture solution interface, to measure an SFG spectrum. As a result, it is possible to measure physical information in the sample in the culture solution-culture solution interface at a high lateral resolution.

Note that in the present embodiment, the culture solution partition 8 is provided. However, the culture solution partition 8 may not be provided as in the case of the first embodiment. Further, as long as the flow of the culture solution 14 is limited and induced to the upper surface of the sample 3, the attachment position and height of the culture solution partition 8 is not limited to the position and height shown in FIG. 4A and FIG. 4B.

Third Embodiment

Figure 5:
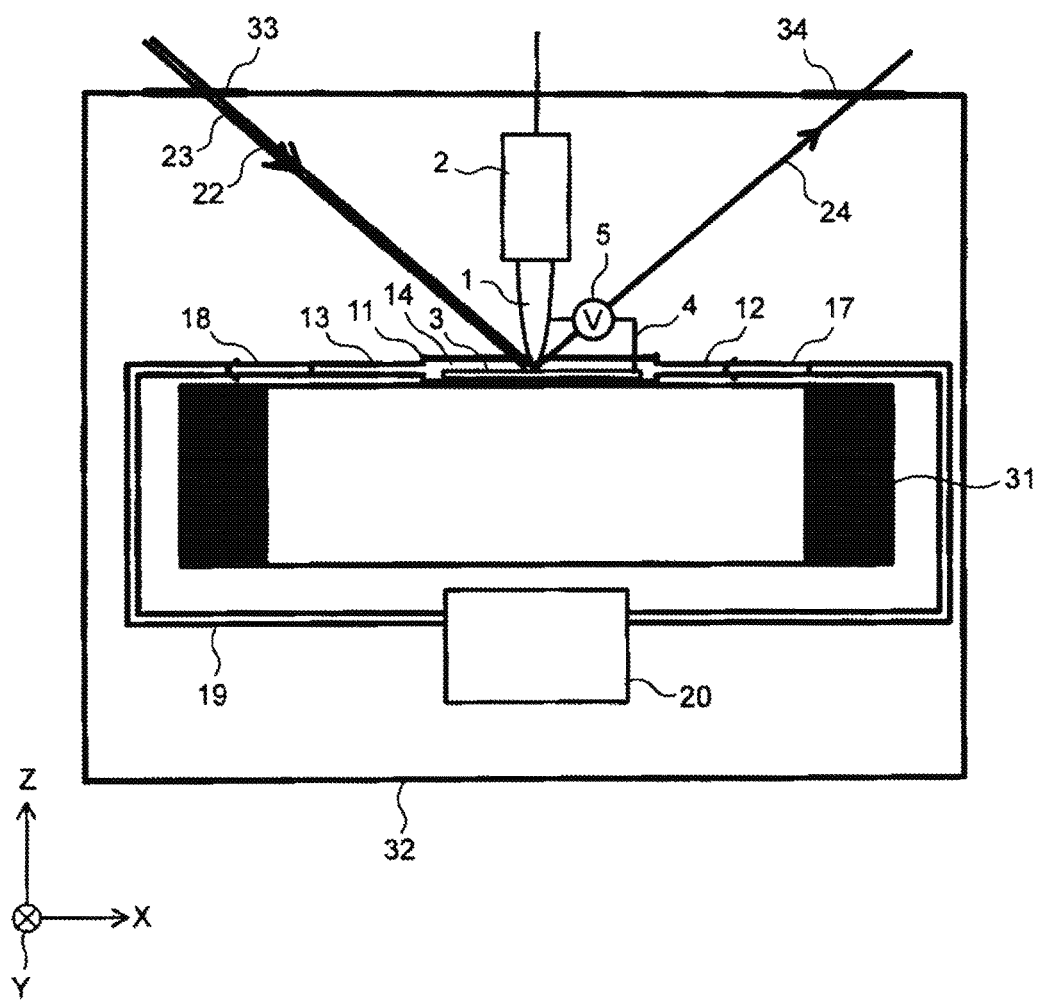
FIG. 5 is a schematic configuration diagram of the scanning probe microscope according to a third embodiment.

FIG. 5 shows a product example of the above-described scanning probe microscope. In the case of the present embodiment, the sample holder 11, the oscillator 2, the culture solution circulation mechanism 19, the culture-solution circulation control mechanism 20, and the scanning mechanism 31 are incorporated in a cell culture device 32. The pulsed laser oscillator 27, the filter integrated detector 25, and the control device 26 are provided outside the cell culture device 32. The cell culture device 32 is provided with windows 33 and 34. The first and second pulsed laser beam 22 and 23 pass through the window 33, and irradiate the sample 3. The output light 24 passes through the window 34, and is detected with the filter integrated detector 25. Accordingly, the windows 33 and 34 are formed of e.g. optical glass or quartz glass to pass the wavelengths of the pulsed laser beam 22 and 23 and the output light 24.

Fourth Embodiment

The above-described scanning probe microscope is applicable to e.g. a tip-enhanced scanning second harmonic microscope. In the following description, the microscope will be described using FIG. 1.

The tip-enhanced scanning second harmonic microscope according to the present embodiment inputs the first pulsed laser beam 22 (infrared pulsed laser beam) having a wavelength of 1064 nm in the vicinity of the region of the sample 3 to which the probe 1 stands close. The tip-enhanced scanning second harmonic microscope detects the output light 24 caused in the sample 3 with the filter integrated detector 25. Note that the filter integrated detector 25 measures the intensity of light at a frequency double of the frequency of the first pulsed laser beam 22.

In the present embodiment, cultured nerve cells are used as the sample 3. By mapping second harmonic intensity measured with the filter integrated detector 25 while measuring the unevenness of the nerve cell (while operating the microscope as an atomic force microscope AFM), a scanning second harmonic microscope is constructed. It is possible to perform mapping of neural activity intensity of the nerve cell. At this time, as in the case of the first embodiment, by optimizing the effect of tip-enhancement, it is possible to construct the tip-enhanced scanning second harmonic microscope.

Fifth Embodiment

The above-described scanning probe microscope is applicable to e.g. a tip-enhanced scanning Raman microscope. In the following description, the microscope will be described using FIG. 1.

The tip-enhanced scanning Raman microscope according to the present embodiment inputs the first pulsed laser beam 22 (green pulsed laser beam) having a wavelength of 532 nm in the vicinity of the region of the sample 3, to which the probe 1 stands close. The tip-enhanced scanning Raman microscope inputs the output light 24 caused in the sample 3 into the filter integrated detector 25, to measure the light intensity of the Raman scattering light.

In the present embodiment, cultured hepatocytes are used as the sample 3. By examining the Raman scattering measured with the filter integrated detector 25 while measuring the unevenness of the hepatocytes (while operating the microscope as the atomic force microscope AFM), it is possible to map the composition distribution of molecules, protein and the like in the hepatocytes. At this time, by optimizing the effect of tip-enhancement as in the case of the first embodiment, it is possible to construct the tip-enhanced scanning Raman microscope.

Sixth Embodiment

The above-described scanning probe microscope is applicable to e.g. a tip-enhanced scanning CARS (Coherent Anti-Stokes Raman Scattering) microscope. The microscope uses coherent anti-stokes Raman scattering. In the case of this microscope, the first pulsed laser beam 22 (angular frequency ω1) and the second pulsed laser beam 23 (angular frequency ω2) having different angular frequencies, synchronized with each other, are inputted in the vicinity of the region of the sample 3, to which the probe 1 stands close. The tip-enhanced scanning CARS microscope inputs the output light 24 caused in the sample 3 into the filter integrated detector 25, to measure the light intensity of the CARS light. At this time, by examining the light intensity of the CARS light while measuring the unevenness of the sample 3 (while operating the microscope as the atomic force microscope AFM), it is possible to map the composition distribution of the molecules, protein and the like of the sample 3. At this time, as in the case of the first embodiment, by optimizing the effect of tip-enhancement, it is possible to construct the tip-enhanced scanning CARS microscope.

Seventh Embodiment

Figure 6:
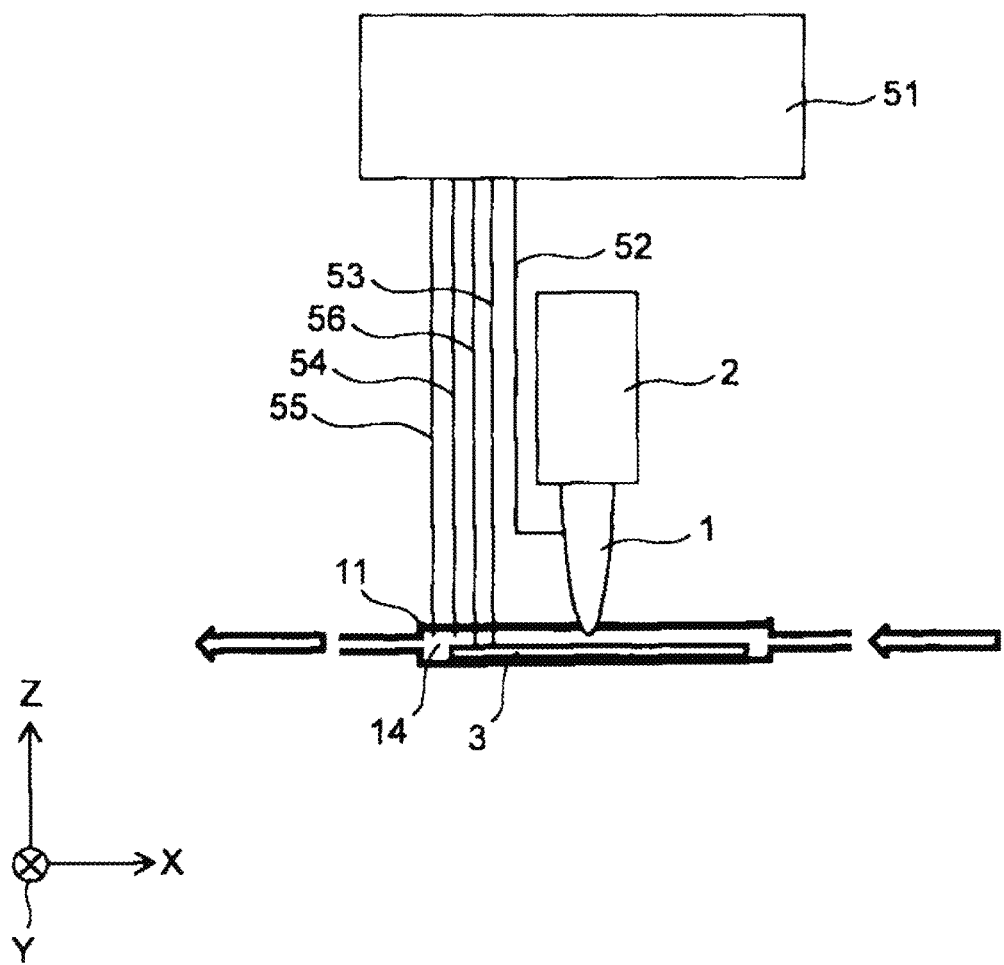
FIG. 6 is a schematic configuration diagram of the scanning probe microscope (Kelvin probe force microscope) according to a seventh embodiment.

The above-described scanning probe microscope is applicable to a Kelvin probe force microscope to measure the electrostatic force distribution of the surface of the sample. The entire configuration of the Kelvin probe force microscope according to the present embodiment is the same as that in the first embodiment (FIG. 1) and the third embodiment (FIG. 5). FIG. 6 shows a part of electrodes as characteristic constituent elements of the present embodiment.

A bipotentiostat 51 controlled with the control device 26 controls application voltages to a probe electrode 52, a sample electrode 53, a working electrode 54, and a reference electrode 55. Further, the bipotentiostat 51 measures the potential of the culture solution 14 with the reference electrode 55. The bipotentiostat 51 applies first voltage corresponding to the measured potential (relative voltage of the probe 1 to the potential of the culture solution 14) to the probe electrode 52. Further, the bipotentiostat 51 applies second voltage corresponding to the measured potential (relative voltage of the sample 3 to the potential of the culture solution 14) to the sample electrode 53. At this time, the electric current flowing between the culture solution 14 and the reference electrode 55 is almost zero.

For example, when chemical reaction is caused by passing an electric current between the culture solution 14 and the sample 3, the bipotentiostat 51 passes an electric current between the working electrode 54 and the sample electrode 53. When voltage is applied between the probe 1 and the sample 3, the bipotentiostat 51 applies voltage between the probe electrode 52 and the sample electrode 53.

Note that when the Kelvin probe force microscope according to the present embodiment is used as a scanning tunnel microscope, the voltage and electric current between the probe electrode 52 and the sample electrode 53 are used as application voltage and tunnel electric current. Further, when charge injection is performed on the sample 3, a charge injection electrode 56 is used.

In the case of the present embodiment, the oscillator 2 is oscillated at a frequency around its natural frequency (within about ±1% of the natural frequency), and the probe 1 is oscillated in the vertical direction to the upper surface of the sample 3. With the phase difference between the alternating current voltage applied to the oscillator 2 and the electric current flowing into the oscillator 2, the interaction (force) between the probe 1 and the sample 3 is obtained, and the distance between the probe 1 and the sample 3 is obtained.

When the electrostatic force distribution of the sample surface is measured by using the Kelvin probe force microscope according to the present embodiment, a voltage signal obtained by summing the alternating current voltage and the direct current voltage is applied between the probe 1 and the sample 3. At this time, an electrostatic force F corresponding to the voltage signal and work functions of the respective surfaces of the probe 1 and the sample 3 is applied between the sample 3 and the probe 1.

The amplitude of the alternating current voltage is a previously set value. The value of the direct current voltage is determined as follows. First, the interaction (force) (force signal) between the probe 1 and the sample 3 is measured with the oscillator 2. With a signal at the same frequency synchronized with the alternating current voltage as a reference signal, the intensity of a frequency component the same as the alternating current voltage of the force signal is detected with a lock-in amplifier.

Assuming that the distance between the probe 1 and the sample 3 is z, the potential difference is V, and the permittivity is ε, as the electrostatic force F applied to the probe 1, $F \propto \varepsilon V^2 / z^2$ holds. Since the signal outputted from the lock-in amplifier is given by differentiation regarding the voltage V of the electrostatic force F, $dF/dV \propto \varepsilon V / z^2$ holds. It is a value proportional to the potential difference as long as the distance z and the permittivity ε are constant.

Accordingly, by adjusting the direct current voltage such that the output signal from the lock-in amplifier is zero, the potential difference between the probe 1 and the sample 3 is always maintained zero. With this configuration, regardless of the surface potential of the sample 3, it is possible to set the electrostatic force F applied to the probe 1 to zero. That is, the potential difference between the probe 1 and the sample 3 is measured with the direct current voltage adjusted to set the electrostatic force F to zero.

At this time, the force signal f is inputted into a second lock-in amplifier, then, with a signal at a double frequency synchronized with the alternating current voltage of the voltage signal as a reference signal, the intensity of the double frequency component of the force signal f is detected. As the signal outputted from the second lock-in amplifier is given by second order differential regarding the voltage V of the force signal f, $d^2f/dV^2 \propto \varepsilon / z^2$ holds. As long as the permittivity ε is constant, it is a value inversely proportional to the square of the distance z between the probe 1 and the sample 3.

Therefore, by scanning the relative position between the sample 3 and the probe 1 with the scanning mechanism 31 in the vertical direction to the sample 3 and in the plane direction of the sample 3, while maintaining the output signal from the second loci-in amplifier constant, it is possible to maintain a constant distance between the probe 1 and the sample 3. With this configuration, it is possible to construct the atomic force microscope (ATM) as a form of the scanning probe microscope. These construct the scanning probe microscope (Kelvin probe force microscope) to measure the electrostatic force distribution of the surface of the sample.

When the electric current flows between culture solution 14 and the probe 1, the sensitivity of the electrostatic force distribution is degraded. However, since the scanning probe microscope according to the present embodiment also uses the sample holder 11 described in the first embodiment, the culture solution thin film 16 is formed on the upper surface of the sample 3 in the opening of the slit 15. It is possible to reduce the contact area between the culture solution 14 and the probe 1. As a result, it is possible to suppress the electric current between the culture solution 14 and the probe 1 as a main cause of sensitivity degradation, and to measure the static electric field distribution of the sample 3 with high lateral resolution.

Eighth Embodiment

In the present embodiment, a nerve signal measuring method for nerve cells using the scanning probe microscope described in the seventh embodiment will be described. In the present embodiment, cultured nerve cells are placed as the sample 3 in the culture solution 14. Further, the probe 1 is attached, oppositely to the upper surface of the sample 3, to the oscillator 2. With the oscillator 2, the probe 1 oscillates in the vertical direction to the upper surface of the sample 3.

The sample 3 is fixed on the scanning mechanism 31 via the sample holder 11. It is movable in a three-dimensional direction with respect to the probe 1. With the oscillator 2, the probe 1 oscillates in the vertical direction to the upper surface of the sample 3, at a frequency around the natural frequency of the oscillator 2 (within about ±1% of the natural frequency). With the phase difference between the alternating current voltage applied to the oscillator 2 and the electric current flowing into the oscillator 2, the interaction (force) between the probe 1 and the sample 3 is obtained, and the distance between the probe 1 and the sample 3 is obtained.

Further, by scanning the relative position between the sample 3 and the probe 1 with the scanning mechanism 31 in the vertical direction to the sample 3 and in the plane direction to the sample 3 while maintaining the phase difference constant, it is possible to construct the atomic force microscope (ATM) as a form of the scanning probe microscope, and to measure the unevenness of the sample surface.

In the nerve signal measurement, the distance between the surface of the sample 3 and the tip of the probe 1 is always maintained constant. The nerve signal is a voltage pulse caused in the nerve cell upon charge injection from the charge injection electrode 56 (FIG. 6) to the nerve cell.

In the nerve signal measurement, first, a voltage pulse is applied to the nerve cell by injecting predetermined charge to the sample 3. At this time, the size of the voltage pulse is about 50 μV to 100 mV. The probe 1 is brought into contact or to approach a desired position of the sample 3, and the voltage pulse is detected with the scanning probe microscope according to the seventh embodiment. By performing the voltage pulse measurement in many points of the sample 3 and determining whether or not the nerve signal is transmitted, it is possible to specify a defective position of the cultured nerve cells.

Ninth Embodiment

Figure 7:
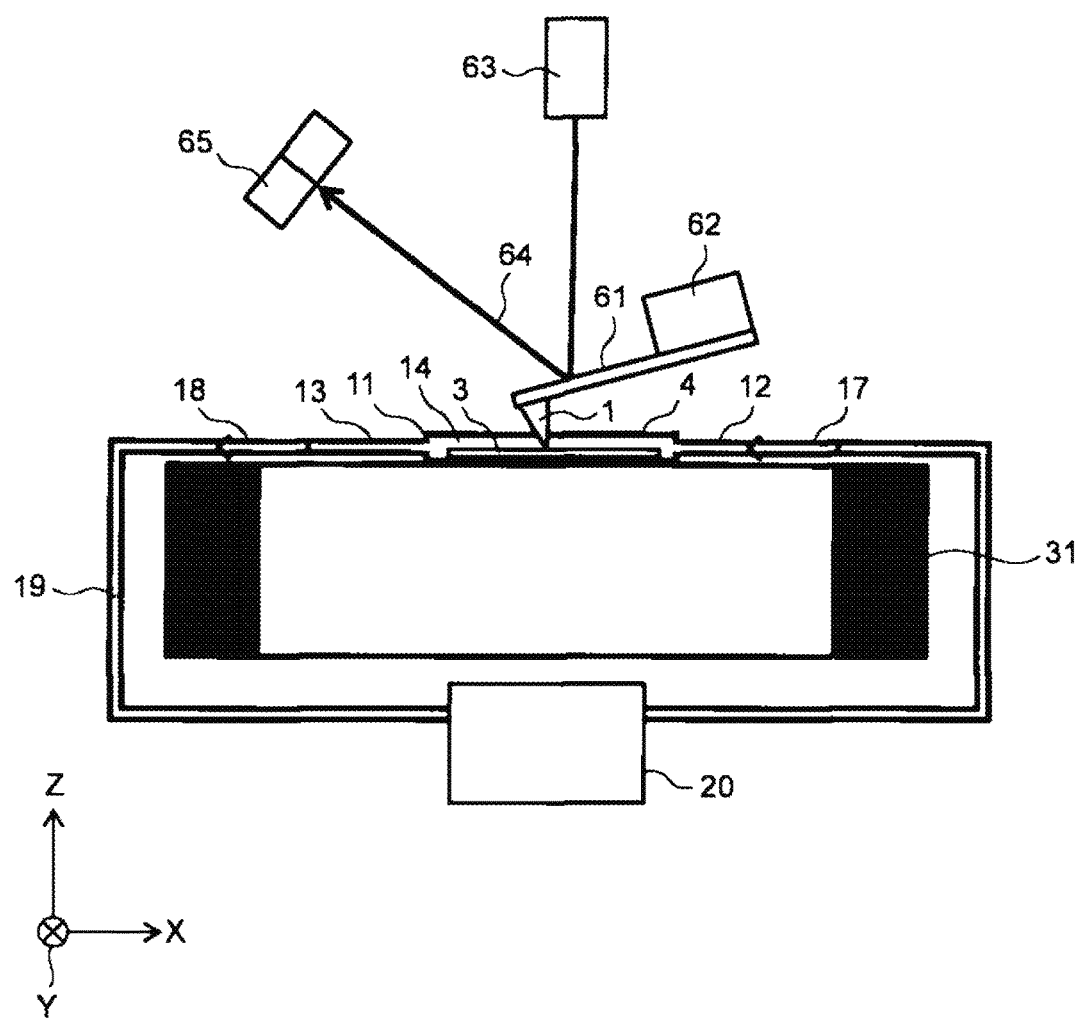
FIG. 7 is a schematic configuration diagram of the scanning probe microscope (submerge scanning probe microscope) according to a ninth embodiment.

The above-described scanning probe microscope is applicable to e.g. a submerge scanning probe microscope using a cantilever. FIG. 7 shows a schematic configuration of a submerge scanning probe microscope according to the present embodiment. A cantilever 61 is provided in an exciter 62. The probe 1 is formed in the vicinity of a free end of the cantilever 61. The relative position between the probe 1 and the sample 3 is controlled with the exciter 62 and the scanning mechanism 31. The cantilever 61 is mechanically vibrated with the exciter 62. The vibration of the exciter 62 is controlled with an unshown control device.

The vibrational amplitude and the phase of the cantilever 61 are detected based on angular change of a detection laser 64, emitted from a detection laser light source 63, then incident on the back surface of the cantilever 61 and reflected. For the detection, a split photodiode 65 in which a light receiving surface is divided into plural regions is used. The respective light receiving regions of the split photodiode 65 generate voltage corresponding to incident area of the detection laser 64. The angular change of the detection laser 64 is detected with an unshown control device based on the difference in potential caused in the respective light receiving regions in correspondence with positional change of the detection laser 64.

In the detection method, the measuring sensitivity is degraded due to scattering of the detection laser 64, reflection from other positions than the back surface of the cantilever 61 and the like. Especially in the submerge measurement, in addition to scattering caused in the process of submerge transmission of the detection laser 64 and reflection caused in the interface between the gas and the liquid, the sensitivity degradation due to viscous resistance applied from the liquid to the cantilever 61 is a problem. To avoid such problem, it is necessary that a probe height D of the cantilever is greater than the film thickness T of the culture solution thin film 16.

Figure 8A:
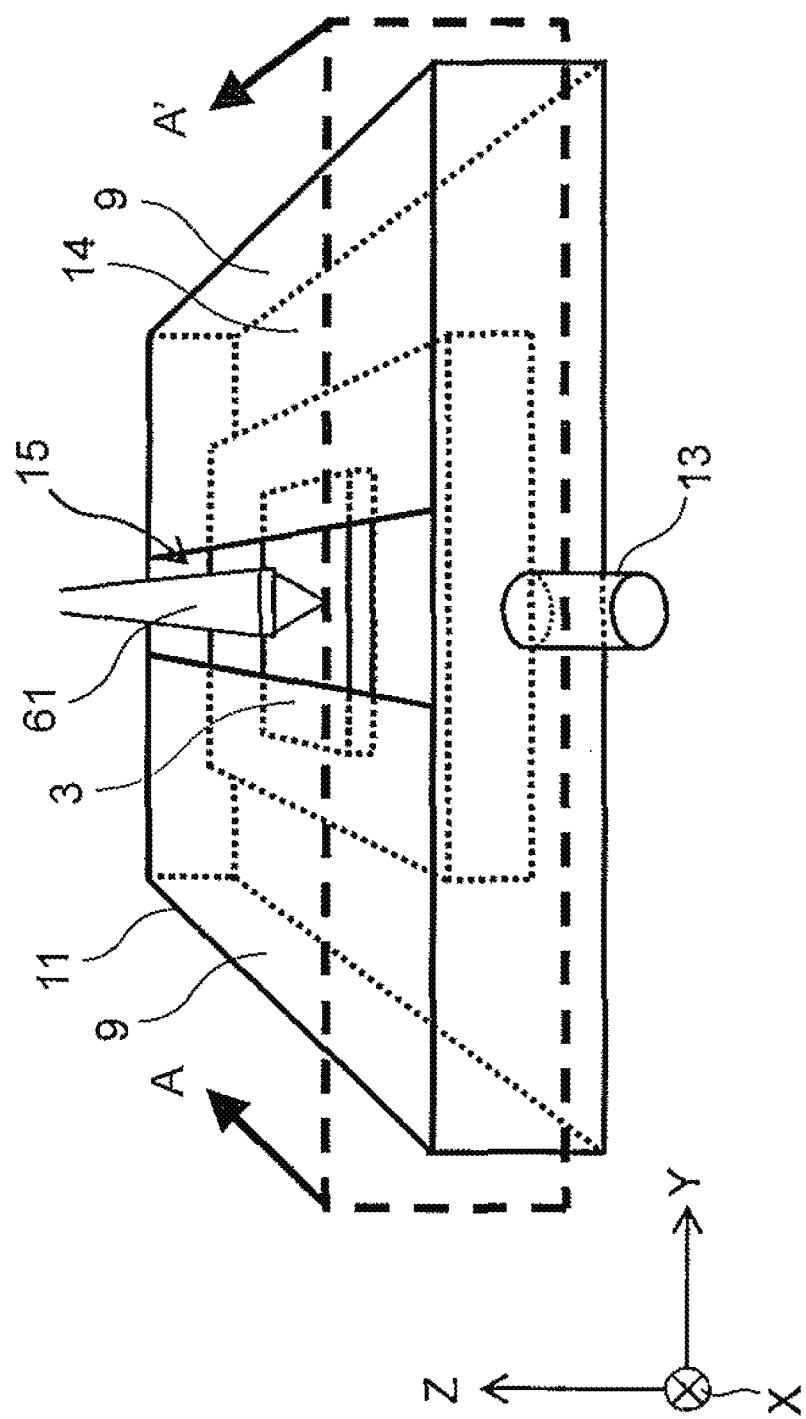
FIG. 8A is a schematic configuration diagram of the sample holder used in the ninth embodiment.

FIG. 8A is a schematic configuration of the sample holder 11 used in the present embodiment. FIG. 8A is a bird's-eye diagram from the direction of the split photodiode 65 (FIG. 7). Accordingly, the culture solution recovery port 13 is shown, but the culture solution inlet 12 is omitted. FIG. 8B is a schematic cross-sectional view of the sample holder 11 according to the present embodiment, showing an arrow view along a line A-A' in FIG. 8A. Note that FIG. 8A shows a case where, in the sample holder 11, the slit 15 is attached in parallel to the circulation direction of the culture solution 14, as in the case of the first embodiment.

As in the case of other embodiments, the slit 15 is formed in the upper lid 9 of the sample holder 11. As shown in FIG. 8A, the slit 15 is used for introduction of the cantilever 61. Further, when the inner space of the sample holder 11 is filled with the culture solution 14, the culture solution thin film 16 is generated between the opening of the slit 15 and the upper surface of the sample 3 as shown in FIG. 8B. As described in the above-described embodiments, the film thickness T of the culture solution thin film 16 is determined based on the surface tension of the culture solution 14, the wettability of the culture solution 14 in the sample 3, the distance T' between the upper lid 9 of the sample holder and the sample 3 (corresponding to the thickness of the spacer inserted between the upper lid 9 and the sample 3), and the slit width W.

Generally, the greater the surface tension of the culture solution 14 is, the smaller the film thickness T of the culture solution thin film 16 is. The poorer the wettability of the culture solution 14 in the sample 3 is, the smaller the film thickness T of the culture solution thin film 16 is. Further, the smaller the distance T' between the upper lid 9 of the sample holder and the sample 3 is, the smaller the film thickness T of the culture solution thin film 16 is. When the film thickness T of the culture solution thin film 16 is set to be smaller than the attachment height D of the probe 1 of the cantilever 61 by utilizing the characteristics, it is possible to expose the back surface of the cantilever 61 in the air and to suppress the influence by the viscous resistance of the liquid.

Note that to introduce the cantilever 61 to the upper surface of the sample 3, it is necessary to set the slit width W to be greater than a width B of the cantilever 61. By satisfying these conditions, it is possible to realize a submerge scanning probe microscope capable of detecting the vibrational amplitude and the phase of the cantilever 61 with an unshown control device with high sensitivity.

Tenth Embodiment

Figure 9:
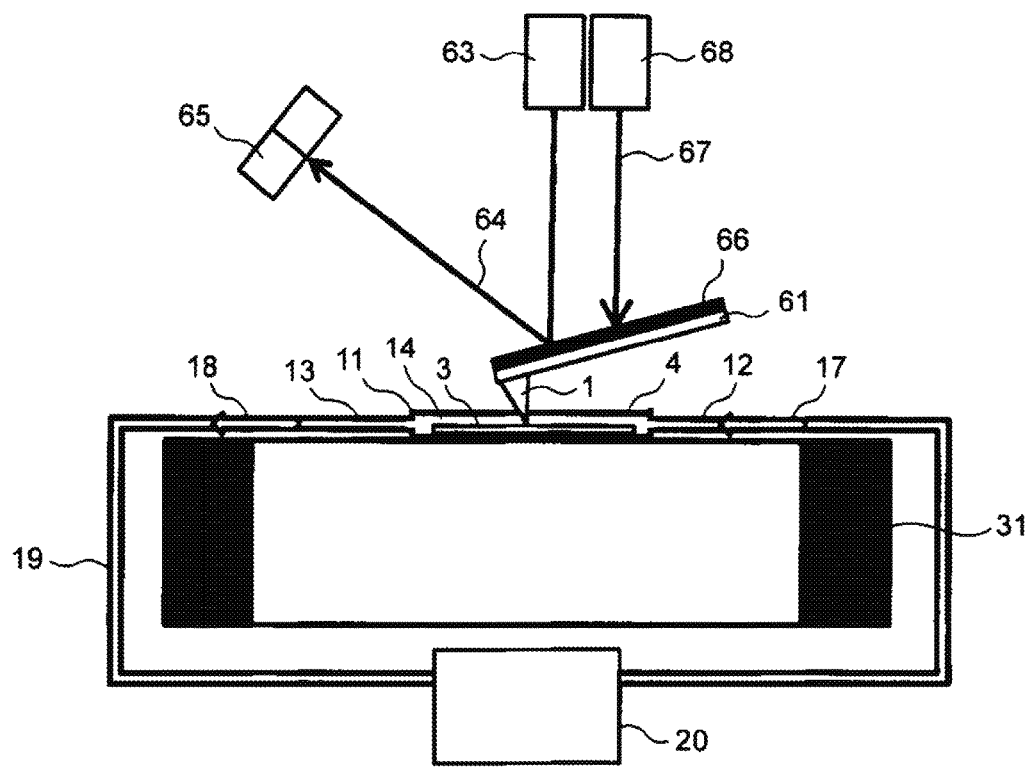
FIG. 9 is a schematic configuration diagram of the submerge scanning probe microscope using a photothermal excitation method according to a tenth embodiment.

As the excitation mechanism for the cantilever 61 described in the ninth embodiment, a magnetic excitation method or a photothermal excitation method other than the mechanical method may be used. FIG. 9 is a schematic configuration diagram of the submerge scanning probe microscope using the photothermal excitation method. In the magnetic excitation method, the back surface of the cantilever 61 is coated with magnetic material. In the photothermal excitation method, the back surface of the cantilever 61 is coated with a metal thin film 66. However, when the cantilever 61 coated with the metal thin film 66 is introduced into the liquid, contamination due to elution of the coat material is a problem.

Further, in the photothermal excitation method, the back surface of the cantilever 61 coated with the metal thin film 66 is irradiated with excitation laser 67. The cantilever 61 is excited by thermal gradient caused by the irradiation. Accordingly, when the cantilever 61 is introduced into the liquid, sensitivity degradation due to the scattering of the excitation laser 67 and thermal diffusion to the culture solution 14 is a problem.

Accordingly, by setting the film thickness T of the culture solution thin film 16 to be smaller than the attachment height D of the probe 1 attached to the cantilever 61, it is possible to expose the back surface of the cantilever 61 in the air. As a result, it is possible to prevent the contamination due to the scattering of the excitation laser 67 irradiated to the back surface of the cantilever 61 and the elution of the coat material. These realize a submerge scanning probe microscope which is capable of detecting the vibrational amplitude and the phase of the cantilever 61 with high sensitivity 61 and which is minimally invasive.

Eleventh Embodiment

As in the case of the scanning probe microscope in the above-described first embodiment, when the film thickness T of the culture solution thin film 16 is determined based on the width of the slit 15 (slit width W) formed in the upper lid 9 of the sample holder 11 and the distance T' between the upper lid 9 of the sample holder 11 and the upper surface of the sample 3, it is possible to determine the distance T' between the upper lid 9 of the sample holder and the sample 3 based on the thickness of the spacer (not shown) inserted between the upper lid 9 of the sample holder and the upper surface of the sample 3.

However, from the viewpoint of slight adjustment of the film thickness T of the culture solution thin film 16, the use of the thickness-fixed spacer (not shown) is not preferable. Accordingly, in the present embodiment, a submerge scanning probe microscope, having the sample holder 11 which enables adjustment of the distance T' between the upper lid 9 of the sample holder 11 and the upper surface of the sample 3 while observing the film thickness T of the culture solution thin film 16, and its control mechanism, will be described.

Figure 10A:
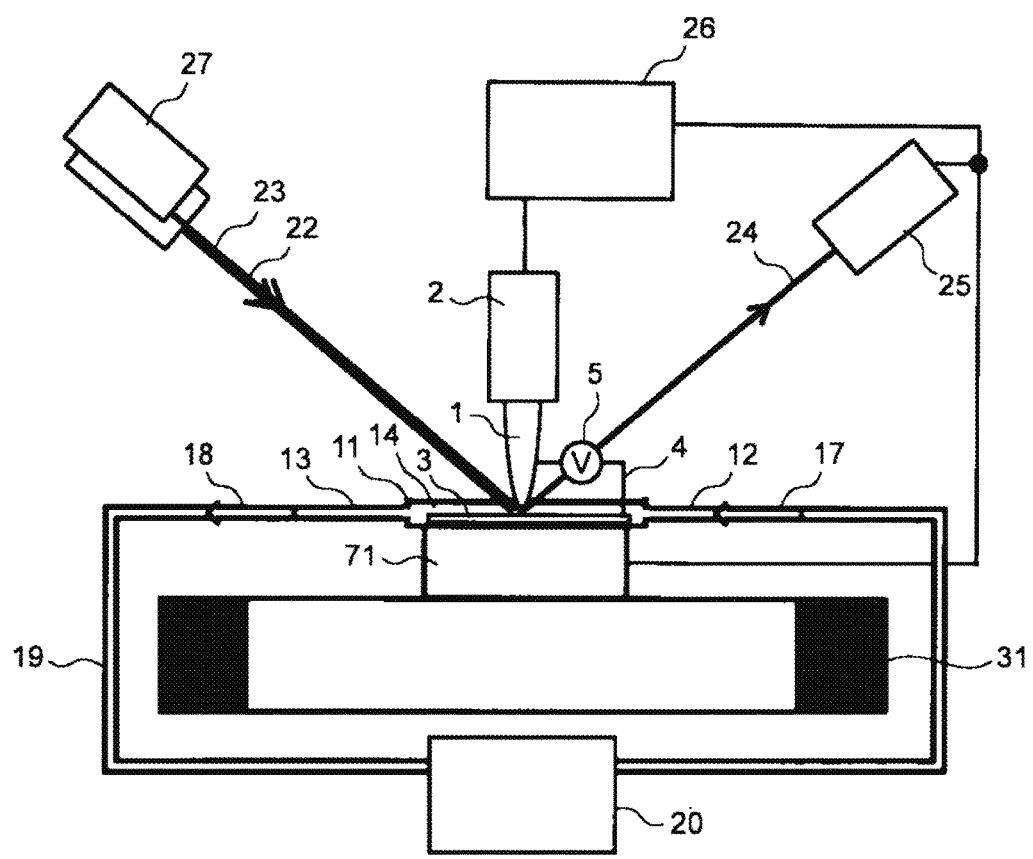
FIG. 10A is a schematic configuration diagram of the scanning probe microscope (submerge scanning probe microscope) according to an eleventh embodiment.

FIG. 10A is a schematic configuration of the scanning probe microscope according to the present embodiment. In FIG. 10A, elements corresponding to those in FIG. 1 have the same reference numerals. In the case of the present embodiment, a sample position control mechanism 71 is provided under the sample holder 11. The position of the sample 3 in the sample holder 11 is controlled such that the laser intensity detected with the filter integrated detector 25 is a designated value.

Figure 10B:
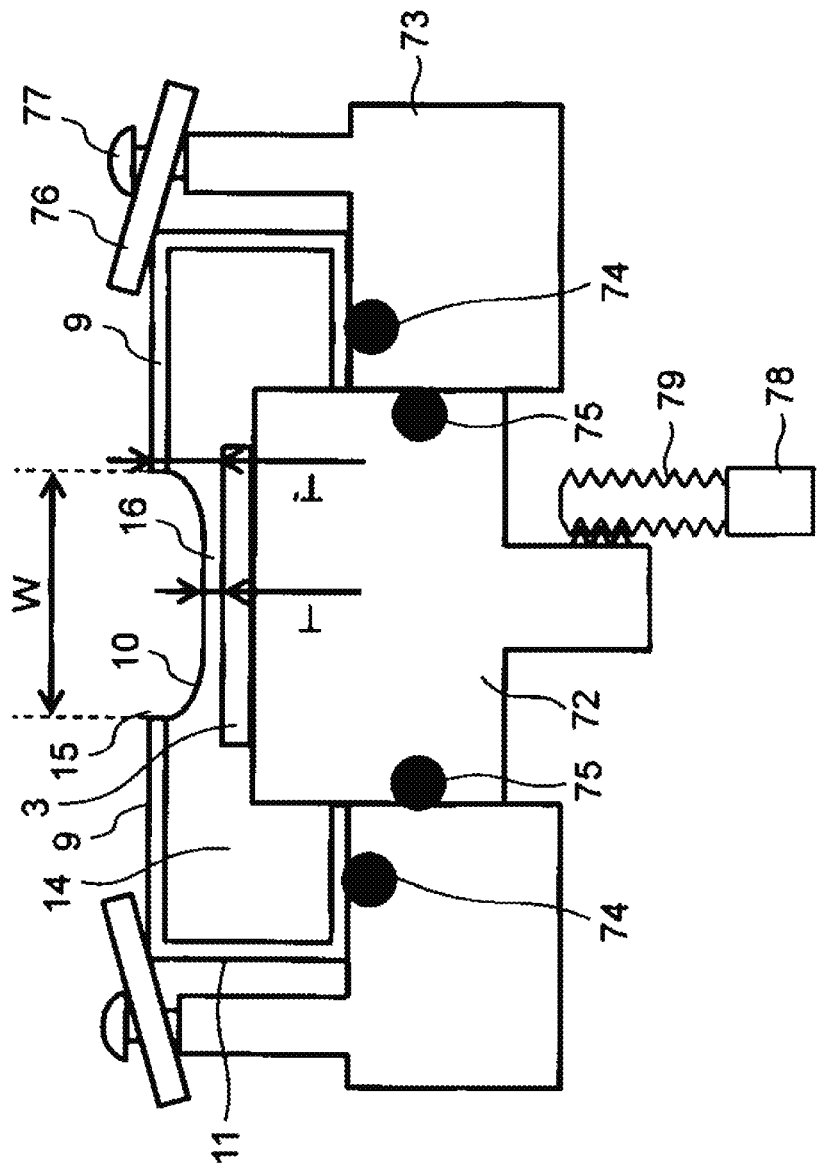
FIG. 10B is a schematic cross-sectional view of the sample holder and a sample position control mechanism used in the eleventh embodiment.

FIG. 10B is a schematic configuration of the sample holder 11 and the sample position control mechanism 71. As in the case of the above-described embodiments, the sample holder 11 has a structure where an upper opening of the rectangular-shaped container 11A is covered with the upper lid 9. The upper lid 9 is provided with the slit 15. Note that the bottom surface of the sample holder 11 according to the present embodiment is cut out in a square shape, and it is fitted over the upper part of a movable sample table 72 having the same shape (corresponding to the sample table 11B).

Note that the movable sample table 72 is attached to the sample holder 11 movably upward and downward while maintain the water-tightness to the bottom surface opening of the sample holder 11. More particularly, for prevention of leakage of the culture solution 14 from the joint between the sample holder 11 and the movable sample table 72, two O rings (an O ring 74 between the sample holder 11 and a fixture 73, and an O ring 75 between the movable sample table 72 and the fixture 73) are provided. With this configuration, the culture solution 14 is held in the space formed between the sample holder 11 and the movable sample table 72.

The sample holder 11 is fixed with a flat spring 76 screw-fixed to a convex member projected upward from the main body of the fixture 73. The movable sample table 72 is movable upward and downward while maintaining the water-tightness with the O ring 75. The control of upper and lower positions of the movable sample table 72 is made by rotational motions of a stepping motor 78 and an upward/downward movement screw 79 attached below the lower part of the movable sample table 72.

The result of detection with the filter integrated detector 25 is fed back to the control with the sample position control mechanism 71 (more particularly, the stepping motor 78 to drive the movable sample table 72). More particularly, with the laser intensity detected with the filter integrated detector 25 as reference, the movable sample table 72 is upward/downward movement controlled so as to detect a SFG signal at predetermined intensity. That is, the distance T' between the upper lid 9 of the sample holder 11 and the upper surface of the sample 3 is adjusted so as to obtain the designated laser intensity with the filter integrated detector 25. As a result, it is possible to previously calibrate the relationship between the intensity of the pulsed laser beam emitted from the pulsed laser oscillator and the thickness T of the culture solution thin film 16. Thus, the submerge scanning probe microscope according to the present embodiment is capable of infallibly forming the solution thin film 16 having the designated thickness T on the upper surface of the sample 3.

Twelfth Embodiment

As described in the first embodiment, the film thickness T of the culture solution thin film 16 formed on the upper surface of the sample 3 is determined based on the surface tension in the interface between the sample 3 and the culture solution 14, the surface tension in the interface between the upper lid 9 of the sample holder 11 and the culture solution 14, the slit width W, and the distance T' between the upper lid 9 of the sample holder 11 and the upper surface of the sample 3. Accordingly, when the surface tension in the respective interfaces are already known, it is possible to calculate the slit width W and the distance T' between the upper lid 9 of the sample holder 11 and the upper surface of the sample 3 necessary to obtain the target film thickness T of the culture solution thin film 16.

Figure 11:
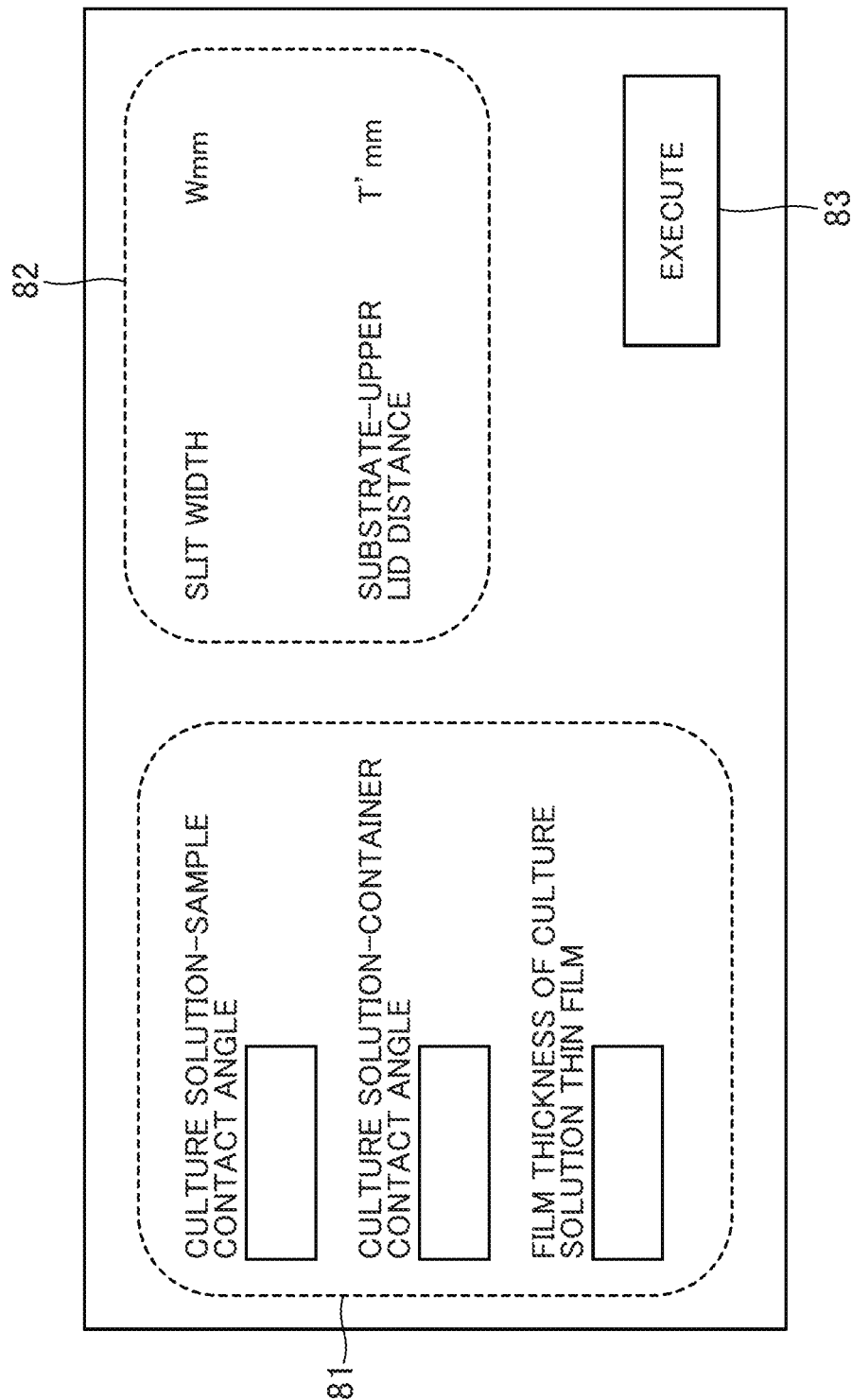
FIG. 11 is a schematic diagram of a graphical user interface according to a twelfth embodiment.

In the present embodiment, the following computer function and display function are incorporated in a calculator (computer) independent of the control device 26 (FIG. 1) and the scanning probe microscope. The control device 26 according to the present embodiment accepts input of (1) a contact angle to provide an index of the degree of the surface tension in the interface between the culture solution 14 and the sample 3, (2) a contact angle to provide an index of the degree of the surface tension in the interface between the culture solution 14 and the container (upper lid 9), and (3) the film thickness T of the culture solution thin film to be formed, through an input text box 81 in a user interface screen shown in FIG. 11.

When a program execution button 83 is clicked, the control device 26 calculates the values of (1) the slit width W and (2) the distance T' between the upper lid 9 of the sample holder 11 and the upper surface of the sample 3, necessary to form the culture solution thin film 16 having the film thickness T, based on the values inputted in the input text box 81, and displays the calculation result on an output text 82. By the incorporation of these functions, the operator can easily select an appropriate sample holder 11 (including the upper lid 9) upon observation of an arbitrary sample 3.

Other Embodiments

By adoption of the above-described embodiments, it is possible to measure or evaluate physical information in the interface between biomolecules, living tissues, biological substrate material and the like in liquid and the liquid with higher accuracy. For example, it is possible to evaluate a cultured substrate, a water purification membrane, and a cultured cell.

In the above embodiments, mainly the interface between the biomolecules, the living tissues and the biological substrate material, and the culture solution is measured or evaluated. Further, the invention may be used for evaluation of the interface of a semiconductor device (for example, P-N junction interface), evaluation of battery interface (evaluation of interface between an electrode and electrolyte) and the like. Especially, as the interface between the electrode and the electrolyte of the battery is an interface between a surface and liquid molecules as in the case of the biomaterial and the culture solution, application is expected. Note that when the invention is used for measurement of the interface between the electrode and the electrolyte, as in the case of FIG. 1, a circulating device for the electrolyte may be provided. However, when the invention is used only for evaluation of a solid interface, the circulating device is not necessarily provided.

LIST OF REFERENCE SIGNS

W slit width
T film thickness of culture solution thin film
T' distance between upper lid of sample holder and sample
D probe height of cantilever
B cantilever width
1 probe
2 oscillator
3 sample
4 wiring
5 probe power source
8 culture solution partition
9 upper lid
10 culture solution shape
11 sample holder
11A container
11B sample table
12 culture solution inlet
13 culture solution recovery port
14 culture solution (water, solvent)
15 slit
16 culture solution thin film
17 culture solution in
18 culture solution out
19 culture solution circulation mechanism
20 culture-solution circulation control mechanism
21 prism
22 first pulsed laser beam
23 second pulsed laser beam
24 output light
25 filter integrated detector
26 control device
27 pulsed laser oscillator
31 scanning mechanism
32 cell culture device or semiconductor inspection device or the like
33 window
34 window
51 bipotentiostat
52 probe electrode
53 sample electrode
54 working electrode
55 reference electrode
56 charge injection electrode
61 cantilever
62 exciter
63 detection laser light source
64 detection laser
65 split photodiode
66 magnetic material or metal thin film
67 excitation laser
68 excitation laser light source
71 sample position control mechanism
72 movable sample table
73 fixture
74 sample holder-fixture O ring
75 movable sample table-fixture O ring
76 flat spring
77 fixing screw
78 stepping motor
79 upward/downward movement screw
81 input text box
82 output text
83 program execution button

The invention claimed is:

1. A sample holder for scanning probe microscope, comprising:
   a container that holds liquid; and
   a tabular-shaped upper lid that covers an upper opening of the container, and that has a slit above a placement position of the sample, wherein the slit having a slit width to form a thin film of the liquid, having a film thickness smaller than a distance between an upper surface of the sample and the upper lid, on the upper surface of the sample, when the liquid is filled between the container and the upper lid.

2. The sample holder for scanning probe microscope according to claim 1,
   wherein the film thickness is a film thickness configured to generate a nonlinear optical signal in the sample when the sample in the liquid is irradiated with a pulsed laser beam.

3. The sample holder for scanning probe microscope according to claim 1,
   wherein the container has an inlet and a recovery port for the liquid, and
   wherein the slit is formed in the upper lid in parallel to a circulation direction of the liquid.

4. The sample holder for scanning probe microscope according to claim 1,
   wherein the container has an inlet and a recovery port for the liquid, and
   wherein the slit is formed in the upper lid in a direction orthogonal to a circulation direction of the liquid.

5. The sample holder for scanning probe microscope according to claim 4, further comprising a partition that limits the flow of the liquid to induce the liquid to the upper surface of the sample.

6. A scanning probe microscope comprising:
   a sample holder having: a container that holds liquid; a tabular-shaped upper lid that covers an upper opening of the container, and that has a slit above a placement position of a sample, wherein the slit forms a thin film of the liquid having a film thickness smaller than a distance between an upper surface of the sample and the upper lid on the upper surface of the sample when the liquid is filled between the container and the upper lid;
   a probe;
   an oscillator that displaces the probe in upward and downward directions;
   a pulsed laser light source that irradiates a pulsed laser beam to a region of the sample measured with the probe;
   a filter integrated detector that measures an intensity of an output light caused in the sample by irradiation of the pulsed laser beam by energy spectroscopy;
   a scanning mechanism that moves the sample holder in a horizontal direction; and
   a control device that controls the oscillator, the pulsed laser beam source, and the scanning mechanism.

7. The scanning probe microscope according to claim 6, wherein, for a film thickness of the thin film being r×100 μm, the pulsed laser light source is configured to apply an energy density per unit area and per unit time of 60 to $480 \times 3^{r-1}$ μJ/mm$^2$/ps.

8. The scanning probe microscope according to claim 6,
further comprising a sample position control mechanism that adjusts a height position of the sample under the sample holder,
wherein the control device controls the sample position control mechanism based on the result of measurement with the filter integrated detector to adjust the height position of the sample and adjust the film thickness of the thin film.

9. The scanning probe microscope according to claim 6,
wherein the pulsed laser beam source has a first light source that irradiates a pulsed laser beam with a fixed wavelength and a second light source that irradiates a pulsed laser beam with a variable wavelength, and
wherein the filter integrated detector detects the sum frequency light as the output light.

10. The scanning probe microscope according to claim 6,
wherein the output light is a second harmonic wave of the pulsed laser beam.

11. The scanning probe microscope according to claim 6,
wherein the output light is Raman scattering light of the pulsed laser beam.

12. The scanning probe microscope according to claim 6,
wherein the oscillator is formed with a cantilever with a probe attached to its end, and an exciter that displaces the cantilever in upward and downward directions.

13. A scanning probe microscope comprising:
a sample holder having: a container that holds liquid; a tabular-shaped upper lid that covers an upper opening of the container and that has a slit above a placement position of a sample, the slit having a slit width to form a thin film of the liquid having a film thickness smaller than a distance between an upper surface of the sample and the upper lid on the upper surface of the sample when the liquid is filled between the container and the upper lid;
a probe;
an oscillator that displaces the probe in upward and downward directions;
a probe power source that applies an alternating current voltage and a direct current voltage to the probe;
a detector that detects a force applied to the probe;
a scanning mechanism that moves the sample holder in a horizontal direction; and
a control device that controls the oscillator, the probe power source, and the scanning mechanism.

* * * * *